(12) United States Patent
Lafleur-Hunker et al.

(10) Patent No.: US 9,694,655 B2
(45) Date of Patent: Jul. 4, 2017

(54) SUNROOF DRAIN HOSE NOISE ABATEMENT DEVICE

(71) Applicant: GM GLOBAL TECHNOLOGY OPERATIONS LLC, Detroit, MI (US)

(72) Inventors: Janet Lafleur-Hunker, Rochester Hills, MI (US); George M Fitzhugh, Detroit, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/960,622

(22) Filed: Dec. 7, 2015

(65) Prior Publication Data

US 2017/0158035 A1 Jun. 8, 2017

(51) Int. Cl.
B60R 13/07 (2006.01)
B60J 7/00 (2006.01)
B60R 13/08 (2006.01)

(52) U.S. Cl.
CPC ......... *B60J 7/0084* (2013.01); *B60R 13/0815* (2013.01)

(58) Field of Classification Search
CPC ..................................................... B60J 7/0084
USPC .............................. 296/38, 213, 208; 138/42
See application file for complete search history.

(56) References Cited

U.S. PATENT DOCUMENTS

| | | | | |
|---|---|---|---|---|
| 1,856,492 A | * | 5/1932 | Marshall | F16K 17/194 137/382 |
| 3,119,704 A | * | 1/1964 | Harrell | B28C 5/381 106/682 |
| 5,725,272 A | * | 3/1998 | Jones | B60R 13/07 277/650 |
| 5,979,902 A | * | 11/1999 | Chang | B29C 44/188 277/314 |
| 6,790,012 B2 | * | 9/2004 | Sharp | F04B 39/0033 181/198 |
| 6,997,205 B2 | * | 2/2006 | Kocek | B65D 90/22 137/15.01 |
| 7,240,700 B2 | * | 7/2007 | Pangallo | B62D 25/24 141/65 |
| 7,866,739 B2 | * | 1/2011 | Thiele | B29C 53/20 296/208 |
| 2012/0138817 A1 | * | 6/2012 | Mondt | C02F 1/325 250/437 |
| 2014/0130533 A1 | * | 5/2014 | Karas | B60H 1/3233 62/291 |
| 2015/0225942 A1 | * | 8/2015 | Pozzana | B29C 44/5663 181/294 |

FOREIGN PATENT DOCUMENTS

EP 1870272 * 12/2007

* cited by examiner

*Primary Examiner* — Dennis H Pedder
(74) *Attorney, Agent, or Firm* — Quinn IP Law

(57) ABSTRACT

A noise abatement device for a vehicle having a body including a sunroof and a sunroof drain hose open for a fluid to flow from the sunroof to outside of the body. The noise abatement device includes a housing and at least one baffle. The housing has an interior wall and is configured to form an entry port connectable to the drain hose and an exit port openable to the outside of the body. The entry port is at a first elevation and the exit port is at as second elevation, lower than the first elevation. At least one baffle is attached to the interior wall. The baffle is configured to allow the fluid to flow via gravity from the entry port to the exit port and to create a tortuous path through the housing to prevent noise from outside of the body from entering the drain hose.

14 Claims, 2 Drawing Sheets

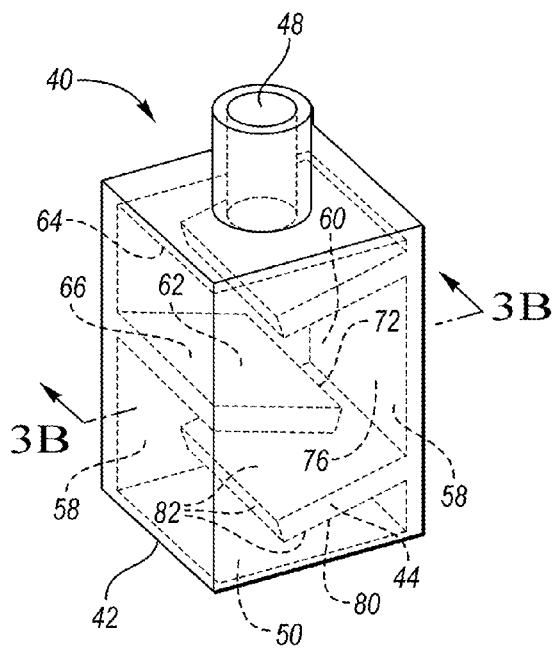
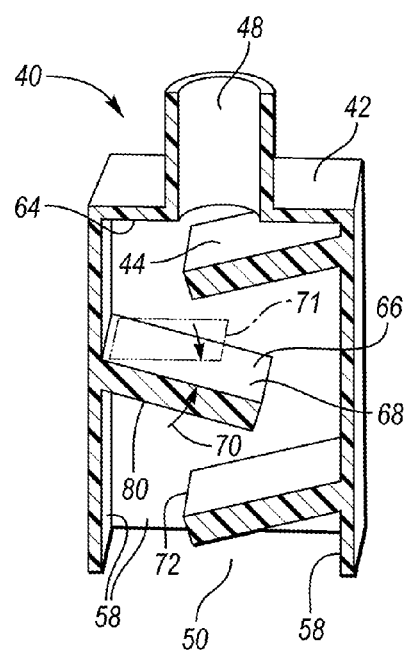
FIG. 3A   FIG. 3B
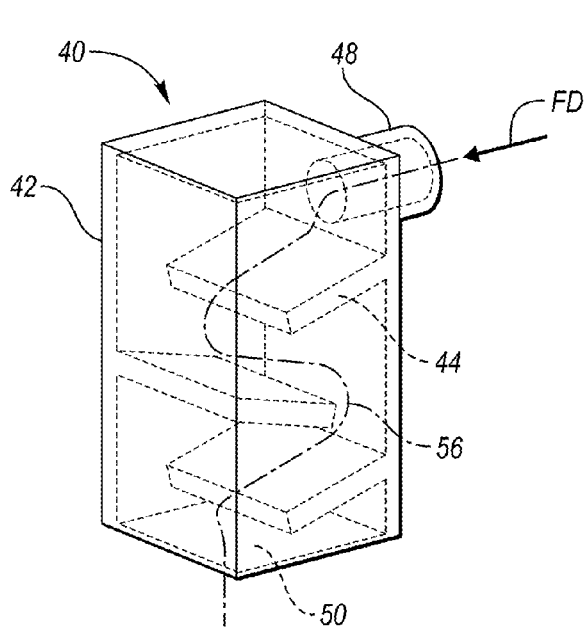
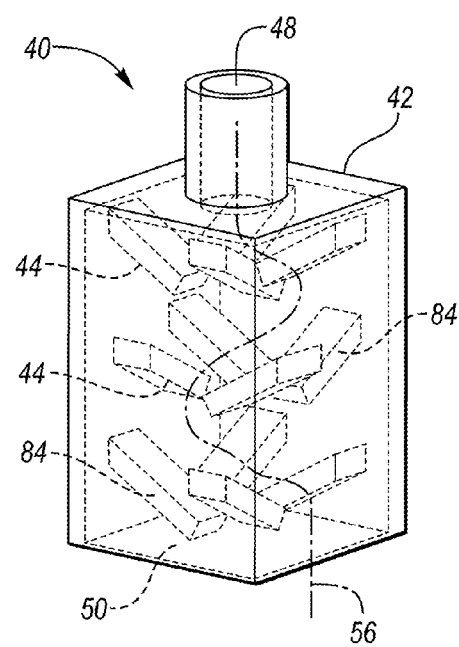
FIG. 4   FIG. 5 ized, for example by the muffler 14 and the other
SUNROOF DRAIN HOSE NOISE ABATEMENT DEVICE

TECHNICAL FIELD

This disclosure relates to a sunroof drain hose noise abatement device.

BACKGROUND

A vehicle may include a body having a sunroof and a sunroof drain hose or tube. The sunroof drain hose is configured to drain rain water and any other liquid from the perimeter of the sunroof opening in the body to an exit opening outside of the body.

SUMMARY

A noise abatement device and a vehicle are disclosed herein. The noise abatement device is for a vehicle having a body including a sunroof and a sunroof drain hose open for a fluid to flow from the sunroof to the outside of the body. The noise abatement device includes a housing and at least one baffle. The housing has an interior wall and is configured to form an entry port connectable to the drain hose and an exit port openable to the outside of the body. The entry port is at a first elevation and the exit port is at as second elevation, wherein the second elevation is lower than the first elevation. At least one baffle is attached to the interior wall of the housing. The baffle is configured to allow the fluid to flow via gravity from the entry port to the exit port and to create a tortuous path through the housing to prevent noise from the outside of the body from entering the drain hose.

The vehicle includes a body having a sunroof frame, a sunroof connected to the sunroof frame, a sunroof drain hose, and a noise abatement device. The sunroof drain hose is connected to the sunroof frame and is open for a fluid to flow from a sunroof frame cavity formed by the sunroof frame to an outside of the body. The noise abatement device includes a housing and at least one baffle. The housing has an interior wall and is configured to form an entry port connected to the drain hose and an exit port open to the outside of the body. The entry port is at a first elevation and the exit port is at as second elevation. The second elevation is lower than the first elevation. The baffle is attached to the interior wall of the housing and is configured to allow the fluid to flow via gravity from the entry port to the exit port and to create a tortuous path through the housing to prevent noise from the outside of the body from entering the drain hose, preventing the noise from the outside of the body from entering the sunroof drain cavity.

The noise abatement device and the vehicle allow a fluid, such as water, to flow out of the sunroof drain hose while preventing noise from the outside of the body from entering the sunroof drain hose. This disclosure applies to any machine or manufacture which includes a drain hose for draining a fluid to the outside via gravity and which is subjectable to noise from the outside. Examples include sunroofs or other openable or fixed openings in cars, trucks, vans, busses, boats, trains, maintenance vehicles and equipment, construction vehicles and equipment, military vehicles and equipment, housing, and commercial buildings.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 3A is a schematic perspective illustration of the sunroof drain hose noise abatement device of FIG. 1 with a housing of the noise abatement device shown in phantom.

FIG. 3B is a schematic cross-sectional illustration, partially in elevation, of the sunroof drain hose noise abatement device of FIG. 1, taken at line 3B of FIG. 3A.

FIG. 4 is a schematic perspective illustration of an alternative embodiment of the sunroof drain hose noise abatement device of FIG. 1, with the housing of the noise abatement device shown in phantom.

FIG. 5 is a schematic perspective illustration of another alternative embodiment of the sunroof drain hose noise abatement device of FIG. 1, with the housing of the noise abatement device shown in phantom.

DETAILED DESCRIPTION

Figure 1:
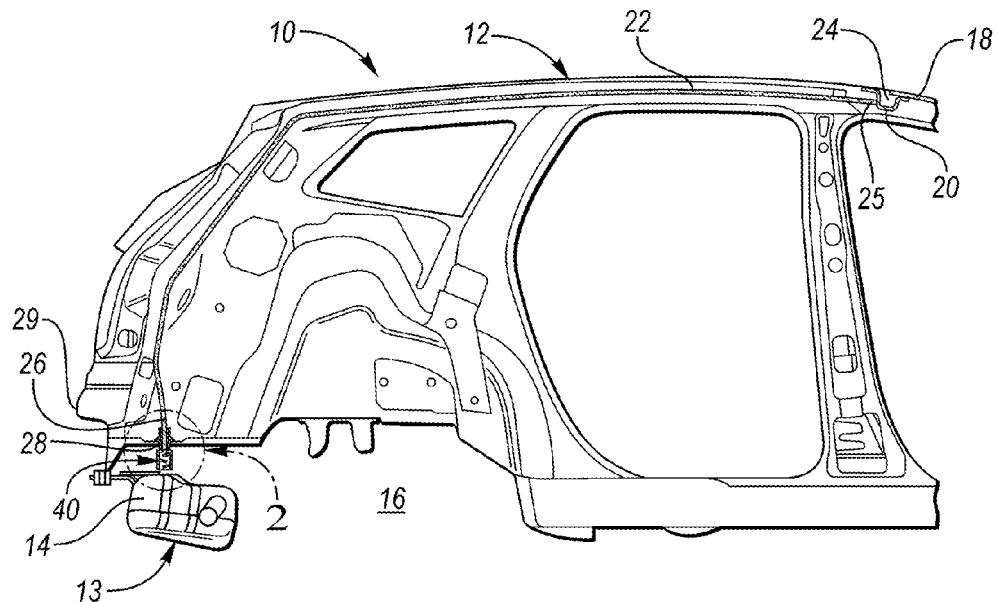
FIG. 1 is a fragmentary schematic side view illustration of a vehicle including a sunroof drain hose noise abatement device, shown in cross-section within circle 2.

Referring to the drawings, wherein like reference numbers refer to like components throughout the views, FIG. 1 shows a vehicle 10 including a body 12. The vehicle 10 may include an engine exhaust system 13 having a muffler 14 and other components (not shown) located at an outside or exterior 16 of the body 12. The muffler 14 and the other components of the vehicle 10, for example a wheel or a brake, may generate noise at the outside 16 of the body 12 when the vehicle 10 is operated. For example, an exhaust gas (not shown) flowing in the exhaust system 13 may generate a flow noise and an interaction of the wheel with a road or ground surface may generate a road noise. Other noises may be generated at the outside 16 of the body 12 by the vehicle 10 and its components themselves and/or by the interaction of the vehicle 10 and its components with the road or ground as the vehicle 10 travels over the road or ground.

The vehicle 10 includes a sunroof 18. The body 12 of the vehicle 10 may include a sunroof frame 20 that is operatively connected to the sunroof 18 such that the sunroof 18 may be opened and closed in at least one way. For example, the sunroof 18 may be slid and/or tilted open. The sunroof frame 20 may at least partially surround the sunroof 18. The sunroof frame 20 or another part of the body 12 proximate to the sunroof 18 may collect a fluid (not shown), for example water from rain, when the sunroof 18 is open.

The vehicle 10 includes at least one sunroof drain hose or tube 22 having an entry end 25 and an exit end 26. The entry end 25 of the sunroof drain hose 22 may be connected to the sunroof frame 20 or to another part of the body 12 proximate to the sunroof 18. The sunroof drain hose 22 is open for the fluid to flow via gravity from a sunroof frame cavity 24 formed by the sunroof frame 20 or from another part of the body 12 proximate to the sunroof 18 to the outside 16 of the body 12. The exit end 26 of the sunroof drain hose 22 exits the body 12 of the vehicle 10 at an exit opening 28 formed in the body 12. The exit opening 28 in the body 12 may be under the body 12 near a rear end 29 of the vehicle 10, as shown, or may be at any other suitable location in the body 12.

Figure 2:
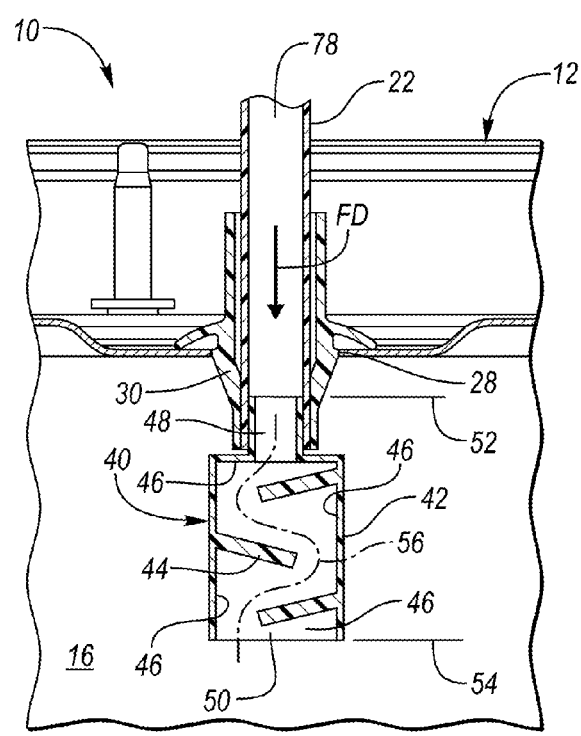
FIG. 2 is a fragmentary schematic cross-sectional illustration, partially in elevation, of a portion of the vehicle of FIG. 1, within circle 2, showing the sunroof drain hose noise abatement device of FIG. 1 in greater detail.

Referring now to FIG. 2, the exit opening 28 in the body 12 may be substantially parallel to the ground plane and the fluid may flow out of the exit end 26 of the sunroof drain hose 22 in a flow direction (arrow FD) that is substantially normal to and downward toward the ground plane, as shown. The ground plane is defined herein as the plane of the ground or road on which the vehicle 10 is traveling or stationary. The exit end 26 of the sunroof drain hose 22 may be located near a source of noise, for example the muffler 14, at the exterior 16 of the body 12, as best seen in FIG. 1.

Referring again to FIG. 2, a grommet 30 may be connected to the body 12 at the exit opening 28. The sunroof drain hose 22 may be connected to the grommet 30 to hold the exit end 26 in place at the exit opening 28 of the body 12 such that the exit end 26 is open to the exterior 16 of the body 12. The grommet 30 may also prevent the sunroof drain hose 22 from contacting any sharp edges of the body 12 at or near the exit opening 28.

Referring now to FIGS. 2-3B, the vehicle 10 includes a noise abatement device 40 having a housing 42 and at least one baffle 44. The housing 42 has an interior wall 46. The interior wall 46 of the housing 42 includes an interior side wall 58 and an interior top wall 58. The interior side wall 58 may be formed from multiple wall segments connected at corners, as shown, or may be a single circular or oval shaped wall. The housing 42 is configured to form an entry port 48 connected to the sunroof drain hose 22 and an exit port 50 open to the outside 16 of the body 12. The entry port 48 is at a first elevation 52 and the exit port 50 is at as second elevation 54. The second elevation 54 is lower than the first elevation 52 such that the fluid will flow from the entry port 48 to the exit port 50 via gravity. The entry port 48 may be directly connected to the sunroof drain hose 22, as shown, or may be connected to the sunroof drain hose 22 via the grommet 30.

The at least one baffle 44 is attached to the interior wall 46 of the housing 42. The baffle 44 is configured to allow the fluid to flow via gravity from the entry port 48 to the exit port 50 and to create a tortuous or convoluted path 56 through the housing 42. The tortuous path 56 prevents noise from the outside 16 of the body 12 from entering the sunroof drain hose 22. Thus, noise from the outside 16 of the body 12 is blocked or prevented from entering and resonating in the sunroof frame cavity 24 or in another part of the body 12 proximate to the sunroof 18 where the sunroof drain hose 22 is connected to the body 12.

The side wall 58 surrounds an interior horizontal cross-sectional area 60 of the housing 42, parallel to the ground plane. The baffle 44 may have a top surface 66 having a top surface area 62. The top surface area 62 of the baffle 44 may be at least one half of the interior horizontal cross-sectional area 60 of the housing 42. Alternatively, the baffle 44 may be at least three quarters of the interior horizontal cross-sectional area 60 of the housing 42. The interior wall 46 of the housing 42 may include a top wall 64. The entry port 48 may be formed on the top wall 64.

Referring now to FIG. 4, in an alternative embodiment, the entry port 48 may be formed on the side wall 58 of the housing 42. This allows the noise abatement device 40 to be connected to the sunroof drain hose 22 when the exit opening 28 in the body 12, best seen in FIG. 2, is in a plane substantially perpendicular to the ground plane and the flow direction (arrow FD) of the fluid at the exit end 26 of the sunroof drain hose 22 substantially parallel to the ground plane. Other entry port 48, exit opening 28, and exit end 26 locations and configurations may be used as appropriate.

Referring again to FIGS. 2-3B, the baffle 44 may have a top surface 66 having a top surface plane 68. The top surface plane 68 may have a slope angle 70 relative to a plane 71 parallel to the ground plane. The slope angle 70 may be at least three degrees. The slope angle 70 may be any appropriate angle that permits the fluid to flow along the tortuous or convoluted path 56 over the top surface 66 of the baffle 44 from the entry port 48 to the exit port 50 via gravity.

The baffle 44 may include an edge 72. The edge 72 of the baffle 44 and the side wall 58 may surround an open horizontal cross-sectional area 76 of the housing 42, parallel to the ground plane. The sunroof drain hose 22 may have an interior cross-sectional hose area 78 sufficient to permit the fluid to flow through the sunroof drain hose 22 via gravity. The open horizontal cross-sectional area 76 may be at least as large as the interior cross-sectional hose area 78.

The baffle 44 may have a bottom surface 80. The bottom surface 80 of the baffle 44 may include a sound absorbing material to improve the absorption or attenuation of sound and to reduce the reflection of sound by the bottom surface 80 of the baffle 44. The baffle 44 may have an exterior surface 82, which includes all of the surfaces of the baffle 44. The exterior surface 82 of the baffle 44 and the interior wall 46 of the housing 42 may include a sound absorbing material to improve absorption or attenuation of sound and to reduce reflection of sound by the exterior surface 82 of the baffle 44 and the interior wall 46 of the housing 42. The noise abatement devise 40 may be made of a sound absorbing material, for example a closed cell foam. The baffle 44 may be made of a sound absorbing material, for example a closed cell foam.

Referring now to FIG. 5, in another embodiment of the noise abatement device 40, at least one baffle 44 is a finger shaped projection 84 extending from the interior wall 46 of the housing 42. The finger shaped projection 84 may be rectangular in cross-section, as shown, or may be round, oval, or any other suitable shape in cross-section. The finger shaped projection 84 is configured to allow the fluid to flow via gravity from the entry port 48 to the exit port 50 and to create the tortuous or convoluted path 56 through the housing 42 to prevent noise from the outside 16 of the body 12 from entering the sunroof drain hose 22.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A noise abatement device for a vehicle having a body including a sunroof and a sunroof drain hose open for a fluid to flow from the sunroof to an outside of the body, the noise abatement device comprising:

a housing having an interior wall and configured to form an entry port connectable to the drain hose and an exit port openable to the outside of the body, wherein the entry port is at a first elevation and the exit port is at a second elevation, and wherein the second elevation is lower than the first elevation; and a multiplicity of baffles attached to the interior wall of the housing and configured to allow the fluid to flow via gravity from the entry port to the exit port and to create a tortuous path through the housing to prevent noise from the outside of the body from entering the drain hose;

wherein the multiplicity of baffles are finger shaped projections extending from the interior wall of the housing;

wherein the finger shaped projections have a length extending from the interior wall of the housing and a width perpendicular to the length and parallel to a ground plane; and wherein the length is greater than the width.

2. The noise abatement device of claim 1, wherein the interior wall of the housing includes a top wall; and wherein the entry port is formed on the top wall.

3. The noise abatement device of claim 1, wherein the interior wall of the housing includes a side wall; and wherein the entry port is formed on the side wall.

4. The noise abatement device of claim 1, wherein the baffle includes a top surface having a top surface plane;

wherein the top surface plane has a slope angle relative to a plane parallel to the ground plane; and wherein the slope angle is at least three degrees.

5. The noise abatement device of claim 1, wherein the interior wall includes a side wall;

wherein the baffle includes an edge;

wherein the side wall and the edge of the baffle surround an open horizontal cross-sectional area;

wherein the drain hose has an interior cross-sectional hose area; and wherein the open horizontal cross-sectional area is at least as large as the interior cross-sectional hose area.

6. The noise abatement device of claim 1, wherein the baffle has a bottom surface; and wherein the bottom surface of the baffle includes a sound absorbing material to improve the absorption of sound by the bottom surface of the baffle.

7. The noise abatement device of claim 1, wherein the baffle is made of a closed cell foam.

8. A vehicle, comprising:

a body having a sunroof frame;

a sunroof connected to the sunroof frame;

a sunroof drain hose connected to the sunroof frame and open for a fluid to flow from a sunroof frame cavity formed by the sunroof frame to an outside of the body;

a noise abatement device, including:

a housing having an interior wall and configured to form an entry port connected to the drain hose and an exit port open to the outside of the body, wherein the entry port is at a first elevation and the exit port is at a second elevation, and wherein the second elevation is lower than the first elevation; and a multiplicity of baffles attached to the interior wall of the housing and configured to allow the fluid to flow via gravity from the entry port to the exit port and to create a tortuous path through the housing to prevent noise from the outside of the body from entering the drain hose, whereby to prevent the noise from the outside of the body from entering the sunroof frame cavity;

wherein the multiplicity of baffles are finger shaped projections extending from the interior wall of the housing;

wherein the finger shaped projections have a length extending from the interior wall of the housing and a width perpendicular to the length and parallel to a ground plane; and wherein the length is greater than the width.

9. The vehicle of claim 8, wherein the interior wall of the housing includes a top wall; and wherein the entry port is formed on the top wall.

10. The vehicle of claim 8, wherein the interior wall of the housing includes a side wall; and wherein the entry port is formed on the side wall.

11. The vehicle of claim 8, wherein the baffle includes a top surface having a top surface plane;

wherein the top surface plane has a slope angle relative to a plane parallel to the ground plane; and wherein the slope angle is at least three degrees.

12. The vehicle of claim 8, wherein the interior wall includes a side wall;

wherein the baffle includes an edge;

wherein the side wall and the edge of the baffle surround an open horizontal cross-sectional area;

wherein the drain hose has an interior cross-sectional hose area; and wherein the open horizontal cross-sectional area is at least as large as the interior cross-sectional hose area.

13. The vehicle of claim 8, wherein the baffle has a bottom surface; and wherein the bottom surface of the baffle includes a sound absorbing material to improve the absorption of sound by the bottom surface of the baffle.

14. The vehicle of claim 8, wherein the baffle is made of a closed cell foam.

* * * * *